United States Patent [19]

Trammell, Jr.

[11] Patent Number: 5,388,847
[45] Date of Patent: Feb. 14, 1995

[54] RIDER PROPELLED VEHICLE AND DRIVE ASSEMBLY THEREFOR

[75] Inventor: Earl M. Trammell, Jr., Chesterfield, Mo.

[73] Assignee: Equi-Cycle Corporation, Chesterfield, Mo.

[21] Appl. No.: 96,649

[22] Filed: Jul. 22, 1993

Related U.S. Application Data

[63] Continuation of Ser. No. 986,091, Dec. 4, 1992, abandoned, which is a continuation-in-part of Ser. No. 816,220, Jan. 3, 1992, Pat. No. 5,188,003.

[51] Int. Cl.$^6$ .............................................. B62M 1/10
[52] U.S. Cl. .................................. 280/215; 280/252; 74/44
[58] Field of Search ............... 280/212, 214, 215, 223, 280/224, 230, 233, 252, 288.1; 74/594.1, 594.3, 594.5, 44

[56] References Cited

U.S. PATENT DOCUMENTS

| | | |
|---|---|---|
| 92,132 | 6/1869 | Westphal . |
| 242,310 | 5/1881 | Harrison . |
| 280,927 | 7/1883 | Hays . |
| 328,709 | 10/1885 | Paessler .................. 280/212 |
| 567,629 | 9/1896 | Young ...................... 280/215 |
| 642,758 | 2/1900 | Runge .................... 280/226.1 |
| 704,377 | 7/1902 | Rieber .................... 280/226.1 |
| 740,156 | 9/1903 | Mendenhall ............. 74/594.1 |
| 868,329 | 10/1907 | Corbitt ..................... 280/215 |
| 1,480,871 | 1/1924 | Tiffin ....................... 280/256 |
| 1,564,548 | 12/1925 | Ford ........................ 280/1.192 |
| 1,677,017 | 7/1928 | Boardman ............... 280/215 |
| 1,707,618 | 4/1929 | Keogh ..................... 280/215 |
| 1,867,731 | 7/1932 | Clarke ..................... 280/215 |
| 1,981,737 | 11/1934 | McIlwain ................ 280/223 |
| 2,481,683 | 9/1949 | Polacek ................... 280/256 |
| 2,638,359 | 5/1953 | Crumble .................. 280/215 |
| 3,403,927 | 10/1968 | Rettger, Jr. .............. 280/261 |
| 3,664,684 | 5/1972 | Long ....................... 280/231 |
| 3,779,099 | 12/1973 | Trammell, Jr. .......... 74/594.3 |
| 3,906,807 | 9/1975 | Trammell, Jr. .......... 74/143 |
| 4,029,334 | 6/1977 | Trammell, Jr. .......... 280/261 |
| 4,108,459 | 8/1978 | Alvigini .................. 280/215 |
| 4,133,550 | 1/1979 | Brown ..................... 280/210 |
| 4,159,652 | 7/1979 | Trammell, Jr. .......... 74/117 |
| 4,327,929 | 5/1982 | Melzian ................... 280/282 |
| 4,416,464 | 11/1983 | Mattox .................... 280/215 |
| 4,548,421 | 10/1985 | Wiener ................ 280/281 LP |
| 4,632,414 | 12/1986 | Ellefson .................. 280/246 |
| 4,634,137 | 1/1987 | Cocksedge .............. 280/256 |
| 4,708,356 | 11/1987 | Levavi .................... 280/255 |
| 5,035,678 | 7/1991 | Hageman ................. 474/50 |
| 5,188,003 | 2/1993 | Trammell, Jr. .......... 74/594.3 |

FOREIGN PATENT DOCUMENTS

| | | | |
|---|---|---|---|
| 565863 | 4/1958 | Belgium ................. 74/594.3 |
| 670559 | 11/1929 | France ................... 74/594.1 |
| 978498 | 11/1950 | France ................... 74/594.3 |
| 1078044 | 11/1954 | France . |
| 94319 | 12/1896 | Germany ............... 74/594.3 |
| 2922691 | 12/1980 | Germany . |
| 432859 | 3/1948 | Italy . |
| 244783 | 9/1946 | Switzerland .......... 74/594.3 |
| 4817 | of 1883 | United Kingdom . |

*Primary Examiner*—Brian L. Johnson
*Assistant Examiner*—Victor E. Johnson
*Attorney, Agent, or Firm*—Senniger, Powers, Leavitt & Roedel

[57] ABSTRACT

A rider propelled vehicle having a drive assembly including pedals and at least one drive wheel mounted on the chassis and operatively connected to the pedals for powering the vehicle. Left and right steering shafts are mounted forwardly of the seat generally at respective laterally opposite sides of the vehicle for pivoting about the longitudinal axes of the shafts. Left and right wheels are mounted on the left and right steering shafts, respectively, for turning about the longitudinal axes of the shafts. A steering assembly for turning the steering shafts about their respective longitudinal axes includes a steering actuator positioned for the rider to grasp and turn relative to the chassis while sitting in the seat to steer the vehicle. The steering assembly and the steering shafts are arranged in a generally inverted-U shape so that the rider's legs may extend through the inverted U to operate the pedals.

20 Claims, 5 Drawing Sheets

FIG. 1

RIDER PROPELLED VEHICLE AND DRIVE ASSEMBLY THEREFOR

This is a continuation of application Ser. No. 07/986,091, filed on Dec. 4, 1992, now abandoned, which is a continuation-in-part of Ser. No. 07/816,220, filed on Jan. 3, 1992 (now U.S. Pat. No. 5,188,003).

SUMMARY OF THE INVENTION

This invention relates generally to rider propelled vehicles and more particularly to such a vehicle powered by reciprocating leg motion.

The most well-known rider propelled vehicles for adults which are presently commercially available are bicycles and, to a substantially lesser degree, tricycles. The bicycles and tricycles which have heretofore been developed for practical transportation (as opposed to those developed for racing or as novelties) have suffered from several deficiencies which limit their popularity. For instance, both bicycles and tricycles of this type require the rider to sit with his or her body a substantial distance off the ground, giving the vehicle a high center of gravity. The bicycle must be completely balanced by the rider. The tricycle is somewhat self-balanced because of its three wheels, but its high center of gravity gives the tricycle a tendency to tip over on turns. Attempts have been made to construct rider propelled vehicles with lower centers of gravity. An example of such an effort is the recumbent tricycle, which requires the rider to sit in a substantially reclined position with the pedals forward of the seat. Thus, although the recumbent tricycle has a lower center of gravity, it is uncomfortable, and in many instances impossible because of age or minor physical infirmity, for adults to assume the reclining position required to operate the vehicle. The recumbent tricycle, therefore, does not provide practical, rider-propelled transportation.

The existing rider propelled vehicles also lack all efficient, powerful drive assembly which maximizes the rider's leg strength. Seats on the presently existing bicycles and tricycles are located completely under the rider and do not have a high back to provide a reaction surface for the riders back to aid the rider in pumping the pedals. Further, in the existing rider propelled vehicles, the pedals are connected directly to crank arms driven in a rotary fashion to power the vehicle. The riders legs must move in a circular path with the pedals. More powerful strokes could be delivered by the rider if the pedals were arranged for linear reciprocating motion. However, the linkage necessary to convert the linear pedal motion to a circular motion of the crank arms introduces the serious problem of low power application to the crank arms when the crank arms pass through their top and bottom dead center positions. At these locations, the direction of the force transmitted from the pedals by the linkage to the crank arms passes through or very near the axis of rotation of the crankshaft so that the torque exerted is negligible. It is believed that the difficulty of providing adequate power to drive a tricycle substantially accounts for the relative unpopularity of tricycles among adult riders.

Although particularly acute when the pedals are driven in a linear, reciprocating fashion, the problem of low power application at the top and bottom dead center positions affects all rider-propelled crank-driven vehicles. A solution to the dead center problem is given in my U.S. Pat. No. 4,029,334, the disclosure of which is incorporated herein by reference. The drive assembly is operable to prevent the pedals from being simultaneously in respective top and bottom dead center positions. A power arm of the drive assembly is connected by a link to a corresponding crank arm, and also to the pedals. The link is operable to accelerate and decelerate the power arms relative to the crank arms during a single revolution so that the power arms avoid simultaneously occupying dead center positions. One power arm is always in a position to provide a substantial torque to the crankshaft. However, it is desirable to provide a drive assembly which provides even more assistance near the top dead center positions of the crank arms, and a drive assembly which operates even more smoothly than my prior design.

Among the several objects and features of the present invention may be noted the provision of a drive assembly for a rider propelled vehicle which allows the vehicle to be propelled over all kinds of terrain at a rapid speed with less effort by the rider; the provision of such a drive assembly which avoids binding at top and bottom dead center positions; the provision of such a drive assembly which operates smoothly and efficiently; the provision of such a drive assembly which stores energy during the power stroke of each pedal and applies that energy to turn the crankshaft when near a dead center position.

Further among the several objects and features of the present invention may be noted the provision of a rider propelled vehicle which is comfortable to sit in, highly stable and can be operated with a reciprocating pedal motion; the provision of such a vehicle which is aerodynamic; the provision of such a vehicle which has front wheel steering without interfering with operation of the pedals; the provision of such a vehicle which is of strong construction; and the provision of such a vehicle which is easy to operate.

The tricycle of the present invention has definite advantages over tricycles and other rider propelled vehicles of the past. Specifically, it provides for a new drive system in combination with a new tricycle chassis that achieves improved performance, comfort and safety for the rider. Importantly, it can be ridden by persons of all ages. The new tricycle incorporates a drive system that permits for efficient reciprocating pedal action. An efficient drive-assembly powered by reciprocating pedal action has not been accomplished in a practical way in the past, and is the reason that few tricycles for adult use are produced today. My new invention permits the use of a high back seat and for the rider to exert stronger leg power. Further, the new design provides for increased pedalling efficiency with less tiring effort on the rider. My new tricycle permits the rider to sit comfortably at a much lower center of gravity than with current bicycles and tricycles. The fact that my tricycle has a lower center of gravity and a more protective chassis for the rider, makes it safety-wise superior to any bicycle or tricycle on the market today.

Generally, a rider propelled vehicle includes a chassis having a front, a rear and left and right sides, and a seat for the rider mounted on the chassis. A drive assembly including pedal means and at least one drive wheel mounted on the chassis is operatively connected to the pedal means for powering the vehicle. Left and right steering shafts mounted forwardly of the seat generally at respective laterally opposite sides of the chassis pivot about their longitudinal axes. Left and right wheels are mounted on the left and right steering shafts, respectively, for turning about the longitudinal axes of the shafts. A steering assembly for turning the steering shafts about their respective longitudinal axes includes a steering actuator positioned for the rider to grasp and turn relative to the chassis while sitting in the seat to steer the vehicle. The steering assembly and the steering shafts are arranged in a generally inverted-U shape so that the rider's legs may extend through the inverted U to operate the pedal means.

In another aspect of the present invention, a drive assembly for a rider propelled vehicle includes a shaft mounted on the vehicle for rotation about a drive axis, and a pair of crank arms operatively connected to the shaft for rotating the shaft about the drive axis with the crank arms revolving around the drive axis. A pair of pedals are each capable of being driven by a pumping motion of one of the rider's legs along a repeating path through a first dead center position in which the rider's leg is generally in its most fully flexed position, and a second dead center position in which the rider's leg is generally in its most fully extended position. Means operatively connecting each of the pedals to a respective crank arm is operable to transmit the motion of the pedals to the crank arms and is movable relative to the crank arms so that when the pedals are in their respective first and second dead center positions the force applied by the rider's leg to the pedal in the first dead center position is directed by said connecting means along a line spaced from the axis of rotation of the shaft. A power assist device operatively connected to the vehicle and the shaft is operable to store energy during a first portion of a revolution of the crank arms, release energy during a second portion of the revolution of the crank arms to assist in driving the rotation of the shaft, store energy during a third portion of the revolution of the crank arms, and release energy during a fourth portion of the revolution of the crank arms to assist in driving the rotation of the shaft.

Other objects and features of the present invention will be in part apparent and in part pointed out hereinafter.

BRIEF DESCRIPTION OF THE DRAWINGS

FIG. 1 is a side elevation of a tricycle of the present invention with wheels of the vehicle shown in phantom;

Corresponding reference characters indicate corresponding parts throughout the several views of the drawings.

DETAILED DESCRIPTION OF THE PREFERRED EMBODIMENT

Figure 1:
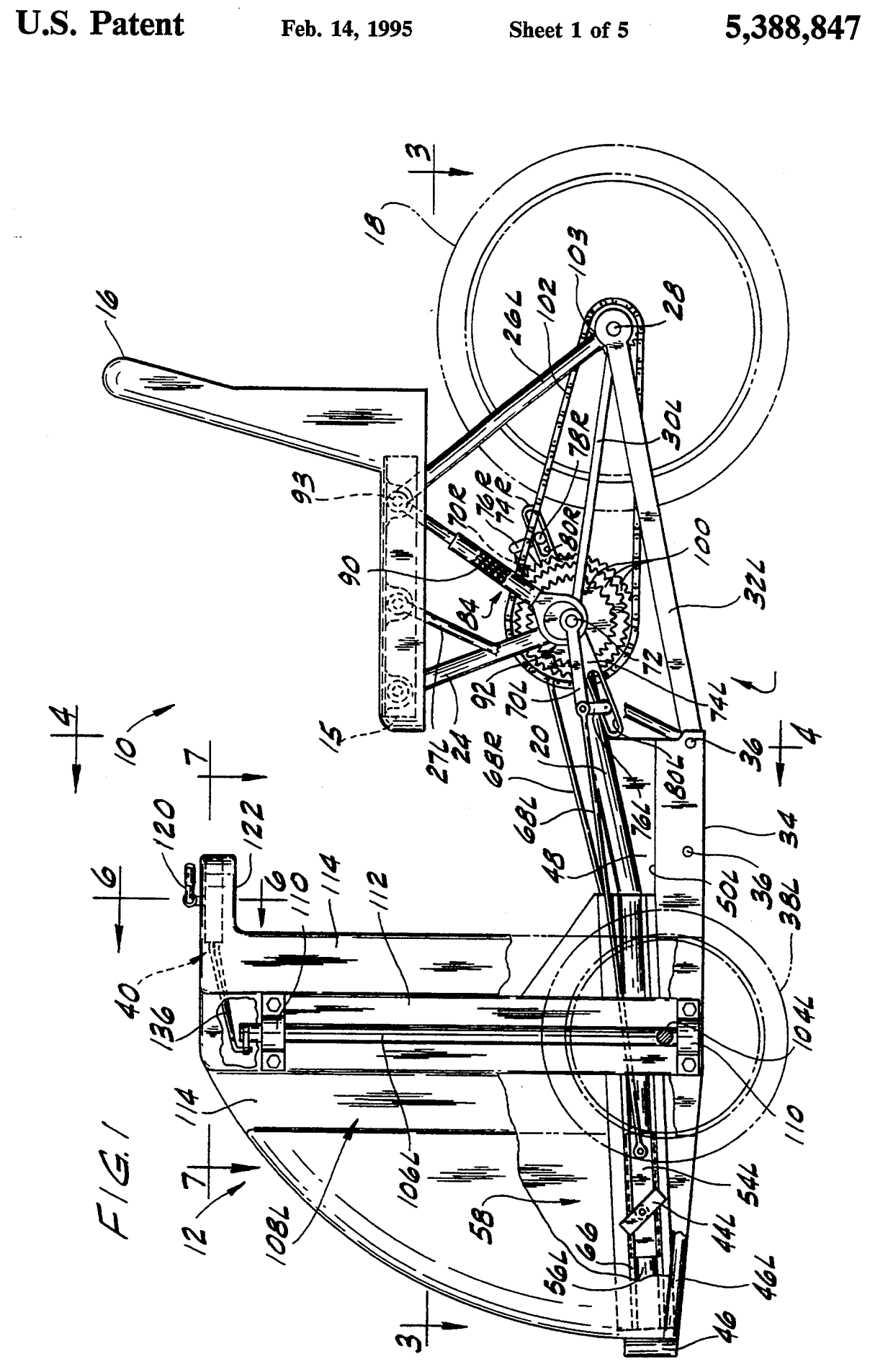
Figure 3:
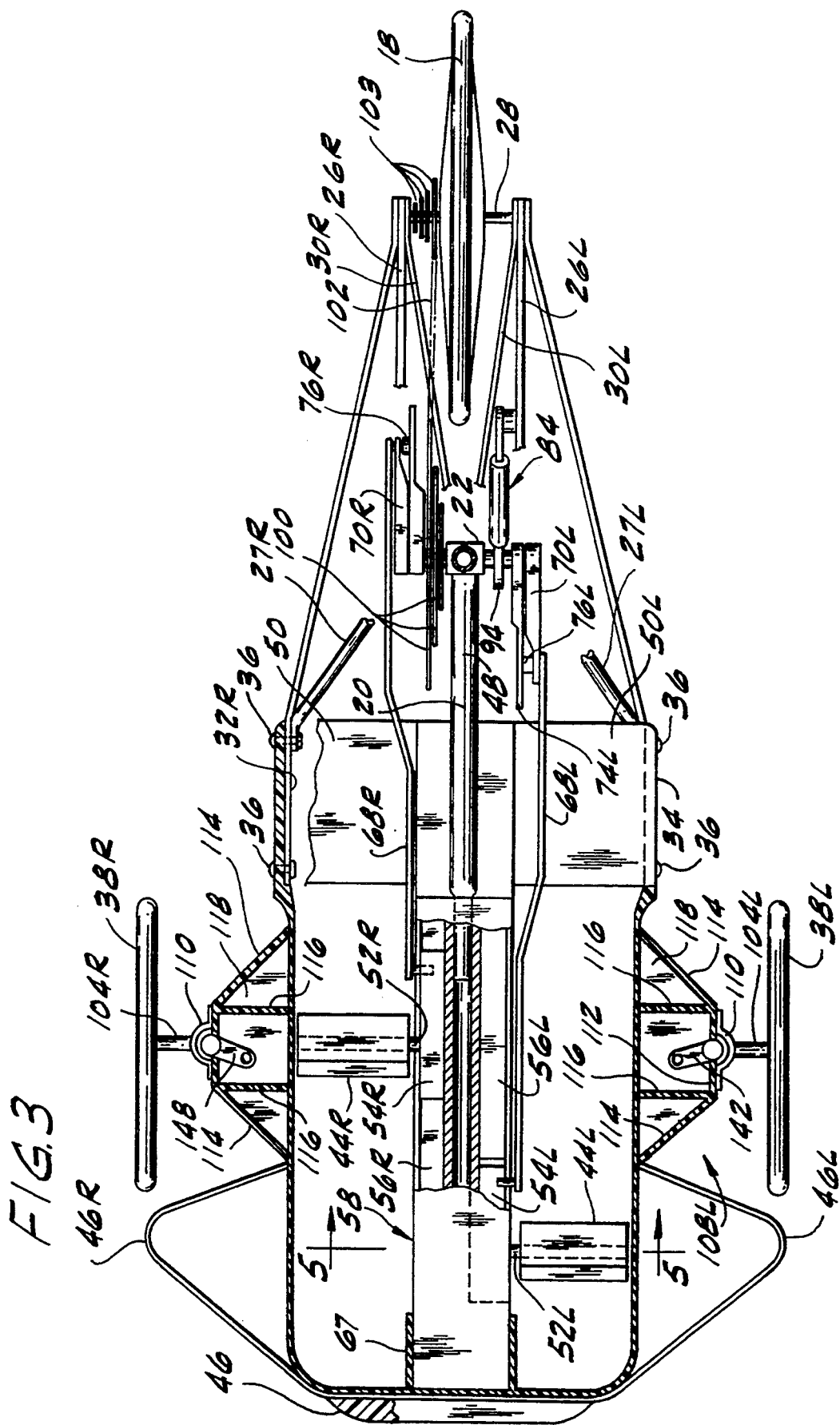
FIG. 3 is a section taken in the plane of line 3—3 of FIG. 1.

Referring now to the drawings, a rider propelled vehicle (in the preferred embodiment a tricycle indicated generally at 10) is shown to comprise a chassis having a front or "hood" section and a rear or "frame" section, indicated generally at 12 and 14, respectively. The frame section 14 is similar in construction to the rear part of an ordinary bicycle frame and has a bracket 15 slidably mounting a seat 16 for the rider. The seat 16, which is shown in its rearwardmost position, may be adjusted forwardly to accommodate riders of different heights. The frame section 14 also mounts a drive wheel 18. Referring now particularly to FIGS. 1 and 3, it may be seen that the frame section 14 includes a central frame member 20 extending forwardly from a crankshaft housing 22 to the hood section 12. A seat post 24 projects upwardly from the crankshaft housing 22 and is connected to the seat bracket 15. A pair of rearward seat stabilizing frame members 26L, 26R (components of the tricycle 10 which are identical on left and right sides of the tricycle will be given the same reference number with the addition of an "L" or "R" to indicate "left" or "right") connected to the seat bracket 15 extend rearwardly and downwardly from the seat bracket 15 to a rear axle 28 on which the drive wheel 18 is mounted. A pair of forward seat stabilizing frame members 27L, 27R extend forwardly and downwardly from the seat bracket 15 to a step section 34 to which they are attached by fasteners 36. Frame members 30L, 30R extend forwardly from the rear axle 28 to the crankshaft housing 22. Wing frame members 32L, 32R on each side of the tricycle 10 extend forwardly from the rear axle 28 to the step section 34, and are attached to the step section by the fasteners 36.

The hood section 12 is preferably molded as one piece from a suitable plastic and, as described in more detail hereinafter, mounts two steerable front wheels 38L, 38R and a steering assembly, generally indicated at 40 (see FIG. 2). The hood section 12 is of a generally inverted-U shape in cross section. The exterior surface of the hood section 12 is closed and has a curved shape to guide air around the hood section with minimal resistance. An open back 42 of the hood section 12 permits the rider's legs to extend under the hood section to pedals 44L, 44R. A bumper 46 mounted on the forward end of the hood section 12 has wings 46L, 46R extending laterally outwardly from the hood section on both sides of the tricycle 10 for protecting the hood section and the steerable front wheels 38L, 38R. The step section 34 has a raised middle portion 48 under the central frame member 20, and lower step portions 50L, 50R on either side of the middle portion for the rider to step on when mounting tire tricycle 10.

Figure 4:
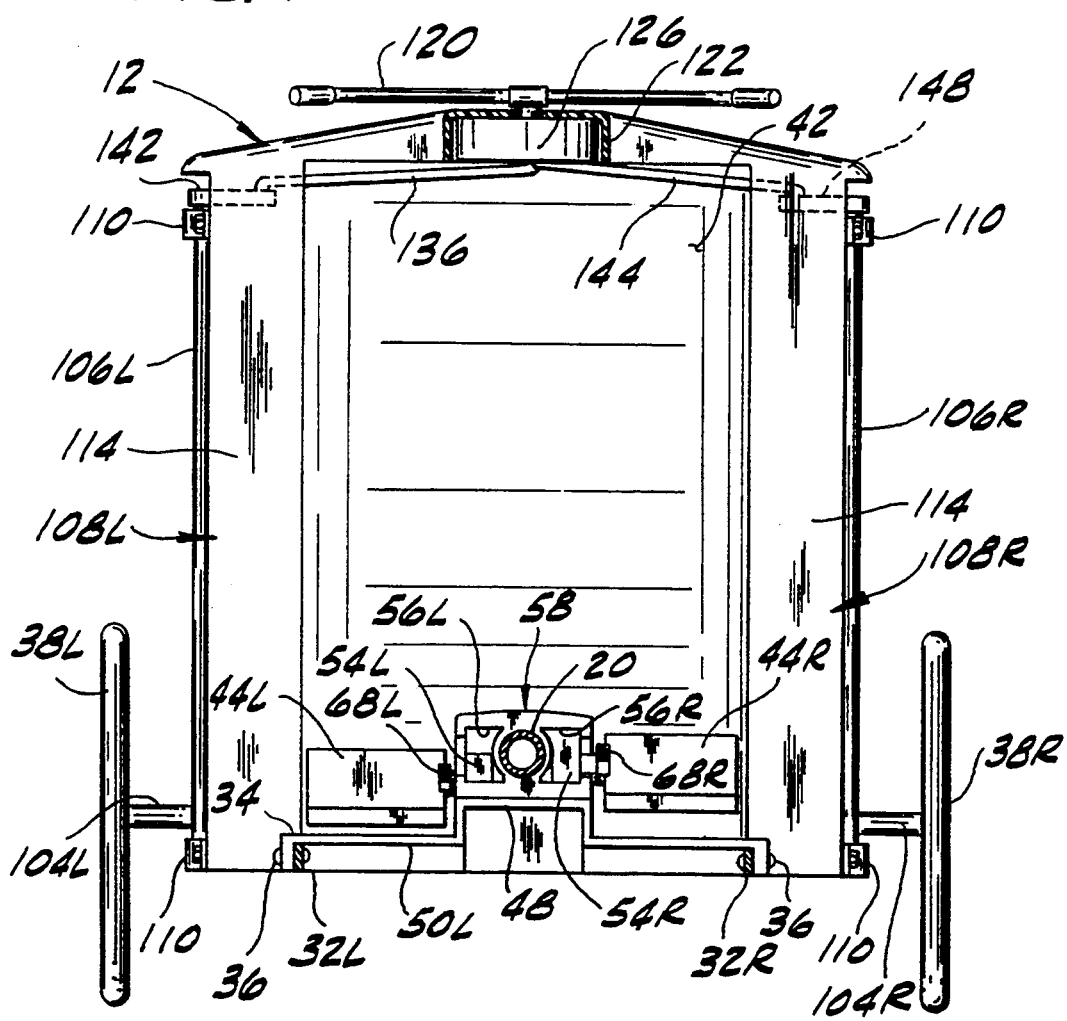
FIG. 4 is a section taken in the plane of line 4—4 of FIG. 1.
Figure 5:
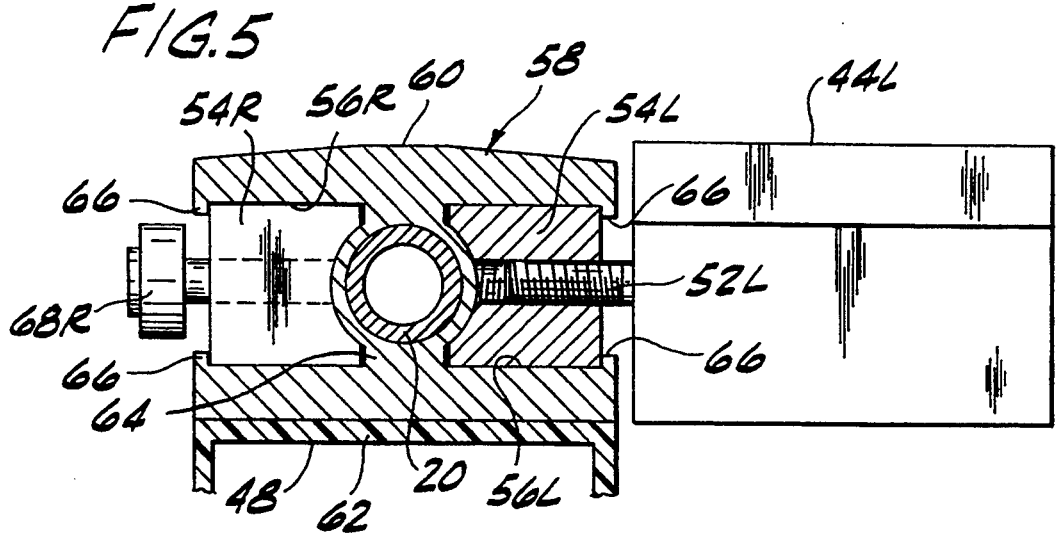
FIG. 5 is an enlarged fragmentary section taken in the plane including line 5—5 of FIG. 3.

The pedals 44L, 44R are each rotatably mounted by studs 52L, 52R on slides 54L, 54R held in channels 56 of a track, indicated generally at 58, for sliding longitudinally of the track in the channels (FIGS. 4 and 5). In the preferred embodiment, the slides 54L, 54R directly engage the track 58 in the channels 56 without the use of roller bearings or the like. In that regard, the slides 54L, 54R and track 58 are made of suitable materials which will slide over each other with minimal frictional interaction. For instance, both the slides 54L, 54R and the track 58 may be made from a composition of nylon and molybdenum disulphide, which is sold under the registered trademark Nylatron ® by The Polymer Corporation of Reading, Pa. This material is strong and weather-resistant, and yet allows the slides 54L, 54R to move in the channels 56 with negligible frictional interaction with the track 58. However, it is to be understood that other structure mounting the pedals 44L, 44R for reciprocating motion, including roller bearings, may be used and still fall within the scope of the present invention.

Each pedal 44L, 44R is capable of being driven by a pumping motion of one of the rider's legs along a linear reciprocating path through a first dead center position in which the rider's leg is generally in its most fully flexed position, and a second dead center position in which the rider's leg is generally in its most fully extended position. The track 58 is I-shaped in cross section having an upper flange 60, a lower flange 62 and a central web 64 interconnecting the flanges. The opposing portions of the upper and lower flanges 60, 62 on either side of the web 64 define the channels 56, and inwardly projecting, longitudinally extending lips 66 retain the slides in the channels. The track 58 is mounted at its forward end by a bracket 67 on the hood section 12, and at its rearward end on the hood section and on the central frame member 20 of the frame section 14. The bracket 67 is preferably formed integrally with the hood section 12. The track 58 is inclined in a front to rear direction so that the pedals 44L, 44R travel along lines which permit comfortable leg motion by the rider.

The pedals 44L, 44R and slides 54L, 54R form part of the tricycle's drive assembly which powers movement of the tricycle 10 and overcomes the problem of the dead center position associated with the conversion of the linear, reciprocating motion of the pedals to the rotary motion of the drive wheel 18. Connector rods 68 pivotally connected at one of their ends to respective slides 54L, 54R at locations rearward of the connection of the pedals 44L, 44R extend rearwardly to respective free-wheeling power arms 70L, 70R, where they are also pivotally connected. The power arms 70L, 70R are mounted on the tricycle's crankshaft 72 for free rotation with respect to the crankshaft about its axis of rotation. The crankshaft 72 is mounted for rotation in the crankshaft housing 22 of the frame section 14. Crank arms 74L, 74R are fixedly mounted on the crankshaft 72 for conjoint rotation with the crankshaft. The crank arms 74L, 74R are connected to respective pedals 44L, 44R by first connecting means, constituting in this embodiment the connector rods 68L, 68R, the power arms 70L, 70R and cam elements 76L, 76R (broadly "link means"), which are mounted for rotation on the distal ends of the power arms and transmit motion from the power arms to the crank arms for rotating the crank arms and crankshaft 72. Each cam element 76L, 76R has an inwardly projecting first cam follower 78L, 78R slidably received in an elongate slot 80L, 80R in the corresponding crank arm 74L, 74R for sliding lengthwise in the slot.

The portion of the drive assembly including the crankshaft 72, power arms 70L, 70R, crank arms 74L, 74R and cam elements 76L, 76R is substantially identical to the drive assembly disclosed in my U.S. Pat. No. 4,029,334. A detailed description of the operation of the drive assembly is given in column 4, line 18 through column 5, line 33 of U.S. Pat. No. 4,029,334. Generally speaking, the power arms 70L, 70R, cam elements 76L, 76R and crank arms 74L, 74R are operable to prevent the force vector exerted by the rider's legs through at least one of the connector rods 68L, 68R from passing through the axis of rotation of the crankshaft 72 at the beginning of the power stroke of each leg. The condition where the force vector applied to the crank arms 74L, 74R by the leg in its power stroke is known as the dead center position of the drive assembly. In the dead center position, although a substantial force is applied to one of the crank arms 74L, 74R, because the vector passes through or close to the axis of rotation of the crankshaft 72 little or no torque is applied to the crankshaft for turning it. The problem of the dead center position is particularly acute when (as is usually the case) one of the rider's legs has reached the end of its power stroke and the other is just beginning its power stroke.

The crank arms 74L, 74R, as is conventional, are fixed at angular orientations 180° opposed to each other. However, the free-wheeling power arms 70L, 70R are permitted a degree of freedom of motion with respect to each other about the crankshaft 72. In FIG. 1, the left pedal 44L is shown in a position at the end of its power stroke, and the right pedal 44R (not shown in FIG. 1) is beginning its power stroke. The connector rod 68L and power arm 70L attached to the left pedal 44L lie along a line passing generally through the axis of rotation of the crankshaft 72. However, it may be seen that the connector rod 68R attaching the right pedal 44R and power arm 70R is substantially spaced from the axis of rotation of the crankshaft 72, so that substantial torque may be applied to the crankshaft in this position. To achieve this configuration it will be noted that the power arms 70L, 70R have moved relative to the crank arms 74L, 74R and to one another so that their angular separation (measured in the counterclockwise direction from the right power arm 74R to the left power arm 74L) is less than 180°. The cam elements 76L, 76R accelerate each of the power arms 70L, 70R ahead of its corresponding crank arm (74L or 74R) during one portion of the crank arm revolution and decelerate each of the power arms behind its corresponding crank arm during another portion of the crank arm revolution.

The drive assembly of the present invention further includes a power assist device, indicated generally at 84, pivotably attached at its upper end to the seat bracket 15, and at its opposite end to the crankshaft 72. The power assist device 84 is operable to store energy during a first portion of a revolution of the crank arms 74L, 74R, release energy during a second portion of the revolution of the crank arms to assist in driving the rotation of the crankshaft 72, store energy during a third portion of the revolution of the crank arms, and release energy during a fourth portion of the revolution of the crank arms to assist ill driving the rotation of the crankshaft. The power assist device 84 is constructed and arranged so that energy is being stored during the middle portions of the power strokes of each pedal 44L, 44R, and energy is released as each stroke ends and the pedal changes direction.

The power assist device 84 is identical in construction and operation to the power assist device described in U.S. Pat. No. 5,188,003, the disclosure of which is incorporated herein by reference. The power assist device 84 includes a generally tubular housing 86 in which a coil spring 88 is located. A piston rod 90 is received in telescoping relation in the housing 86 from its upper end and through the middle of the convolutions of the coil spring 88. Second connecting means, generally indicated at 92, is attached at its upper end to the lower end of the housing 86. The spring 88 (broadly "energy storing means") is attached to the housing 86 adjacent the upper and lower ends of the housing. The spring 88 is also attached to the piston rod 90 generally midway between the upper and lower ends of the spring. Thus, the ends of the spring 88 are generally fixed relative the housing 86 for motion with the housing, and the middle of the spring is generally fixed relative the piston rod 90.

The upper end of the piston rod 90 is pivotably mounted by a pin assembly 93 on the left rearward seat stabilizing frame member 26L so that the entire power assist device 84 may swing relative the frame section 14 generally in a vertical plane parallel to the lengthwise extension of the tricycle 10. The second connecting means 92 comprises a second cam follower 94 having a generally teardrop shaped contour and a circular cam 96 located in an opening in the second cam follower for rotation relative to the second can follower in the opening. The circular cam 96 is attached to the crankshaft 72 at a position between the crankshaft housing 22 and the left crank arm 74L (as shown in FIG. 3). The crankshaft 72 passes through an opening in the cam 96 at a location which is spaced from the center of the cam, and is connected to the cam for conjoint rotation.

The eccentric rotation of the cam 96 about the crankshaft 72 cyclically moves the second cam follower 94 from side to side and up and down relative the seat bracket 15. The housing 86, which is fixed to the upper end of the second cam follower 94, moves conjointly with the second cam follower. However, the piston rod 90 is mounted on the seat bracket 15 only for pivoting motion from front to rear, and does not move vertically with respect to the seat bracket. Therefore, as the housing 86 is moved by the second cam follower 94, the piston rod 90 extends from and retracts into the housing causing the spring 88 to be loaded and unloaded for storing and releasing energy as described above. The center of the circular cam 96 is angularly offset with respect to the centerline of the crank arms 74L, 74R about the longitudinal axis of the crankshaft 72. The offset allows the power assist device 84 to supply power through the dead center positions and store energy during the middle portions of the power strokes.

The drive assembly operates to power the tricycle 10 smoothly both on flat and inclined roadways. The arrangement of the crank arms 74L, 74R, power arms 70L, 70R and interconnecting cam element prevents the drive assembly from being in a dead center configuration at the end of the power stroke of the each of the rider's legs. The power assist device 84 transfers some of the energy applied by the rider during the middle portion of the power stroke of each leg to the crankshaft 72 at the end of each power stroke. The power assist device 84 is believed to smooth out the operation of the power arms 70L, 70R, crank arms 74L, 74R and cam elements 76L, 76R. Together, the power arms 70L, 70R, interconnecting cam elements 76L, 76R and power assist device 84 constitute in this embodiment means for assisting pedaling through the dead center positions. The crankshaft 72 rotated by the drive assembly has a series of sprocket gears 100 mounted for conjoint rotation on the crankshaft to the right of the crankshaft housing 22. A chain 102 meshed in one of the gears 100 extends to sprocket gears 103 mounted on the rear axle 28 for transmitting the power from the drive assembly to the drive wheel 18. A standard derailleur system (not shown) is provided for shifting gears.

The tricycle 10 is steered by its steerable front wheels 38L, 38R which are mounted on axles 104L, 104R fixedly connected to steering shafts 106L, 106R mounted forwardly of the seat 16 generally at respective laterally opposite sides of the hood section 12, and actuated by the steering assembly 40 located centrally of the tricycle. The steering shafts 106L, 106R and steering assembly 40 are arranged in a generally inverted-U shape so that the rider's legs may extend through the inverted-U to operate the pedals 44L, 44R. The steering shafts 106L, 106R are each mounted on the exterior of respective box channels 108L, 108R (broadly "mounting portions") by upper and lower journal connectors 110 which permit rotation of the shafts 106L, 106R about their substantially vertically oriented longitudinal axes. The box channels 108L, 108R are preferably molded as one piece with the hood section 12 and project outwardly of the hood section to provide space for turning the front wheels 38L, 38R. The box channels 108L, 108R include flat faces 112 on which the steering shafts 106L, 106R are mounted, slanted exterior wing panels 114 and interior walls 116 defining along with the flat face three sides of a rectangle. Vertically spaced ribs 118 (only one is shown) in the box channels 108L, 108R provide additional strength. The box channels 108L, 108R give the hood section 12 the strength to rigidly mount the shafts 106L, 106R and front wheels 38L, 38R.

Figure 6:
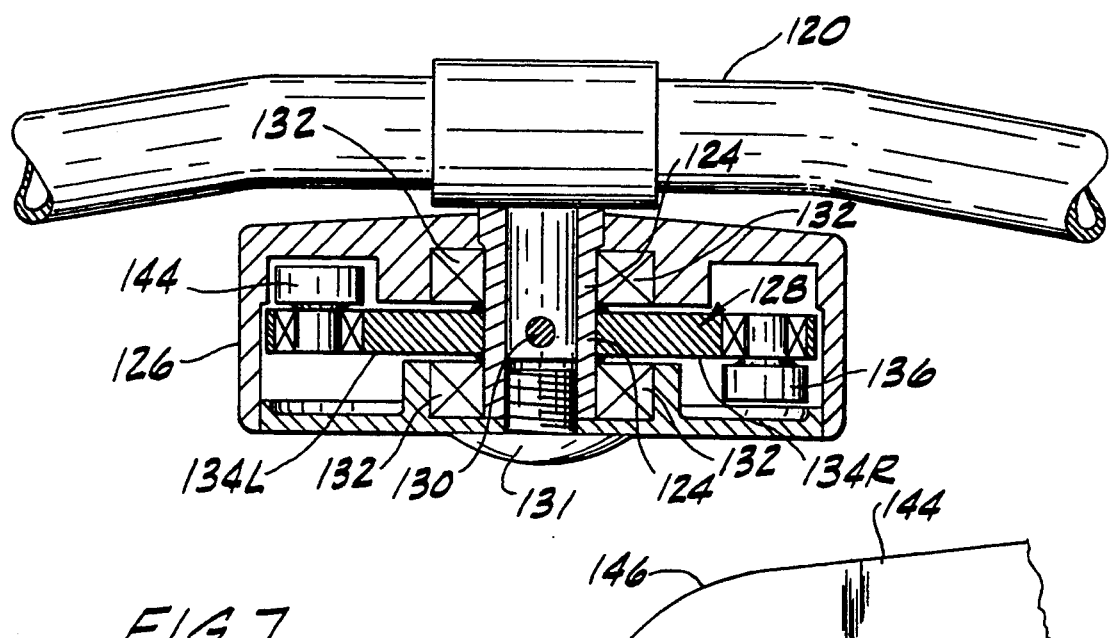
FIG. 6 is all enlarged fragmentary section of the tricycle's steering column taken in the plane including line 6—6 of FIG. 1.

The steering assembly 40 for turning the steering shafts 106L, 106R about their respective longitudinal axes includes handle bars 120 (broadly "a steering actuator") located on a rearwardly extending projection 122 of the hood section 12 for the rider to grasp and turn relative to the hood section while sitting in the seat 16 to steer the tricycle. As shown in FIG. 6, the handle bars 120 are mounted on a steering column including a tubular post 124 extending downwardly into in a disc-shaped housing 126 mounted on the rearwardly extending projection 122, and a pivot member 128 rigidly attached by a pin 130 to the post. The post 124 is held in the housing 126 by a threaded fastener 131 received in the lower end of the post. The post 124 and pivot member 128 are mounted for conjoint rotation with the post 124 about its longitudinal axis by upper and lower bearings 132. The pivot member 128 has left and right arms 134L, 134R projecting outwardly from the post 124.

Figure 2:
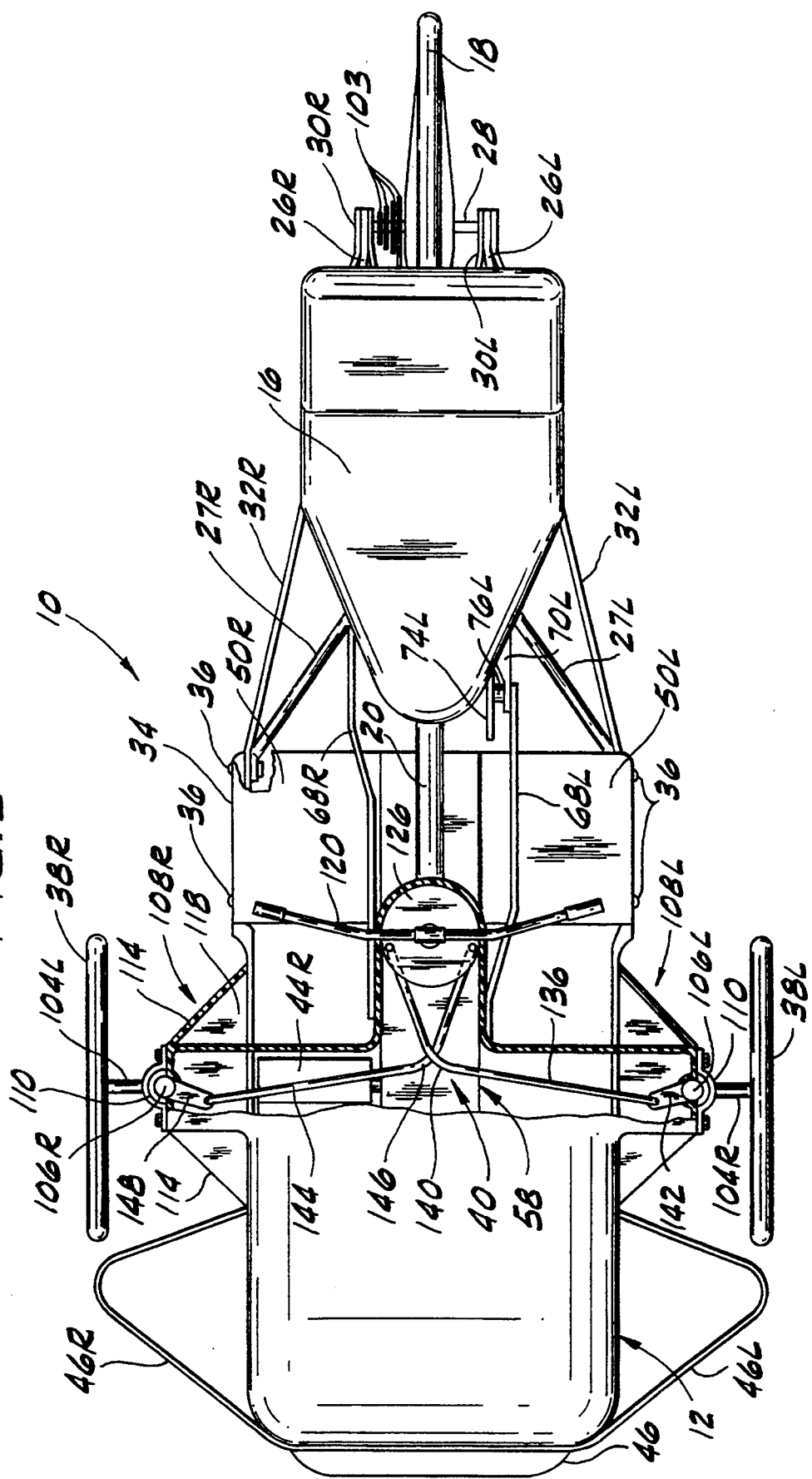
FIG. 2 is a top plan view thereof, with parts broken away to show details.
Figure 7:
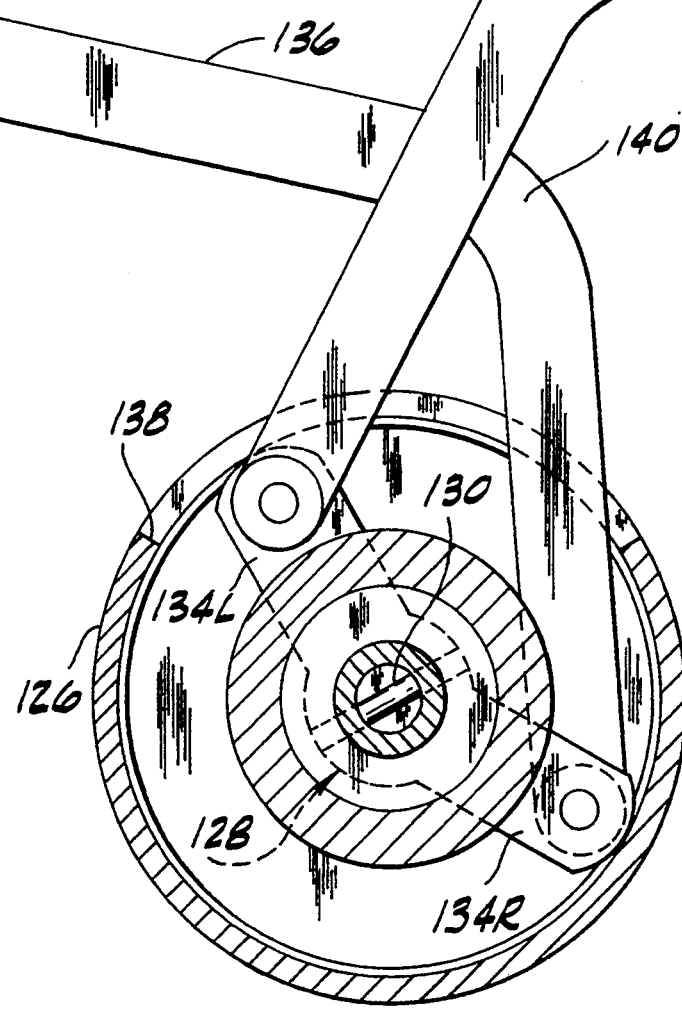
FIG. 7 is a section taken in the plane of line 7—7 of FIG. 6.

Referring now particularly to FIGS. 2, 6 and 7, a first connector 136 is pivotally mounted at one end on the bottom side of the distal end of the right arm 134R of the pivot member, and extends out of the housing 126 through an opening 138 in the front of the housing. The first connector 136 has a bend 140 outside the housing and extends from the bend to a tongue 142 attached to the left steering shaft 106L. Similarly, a second connector 144 is pivotally mounted at one end on the top side of the distal end of the left arm 134L of the pivot member, and extends forwardly out of the housing 126 through the opening 138. The second connector 144 has a bend 146 outside the housing 126 and extends from the bend to a tongue 148 attached to the right steering shaft 106R. The first and second connectors 136, 144 are pivotally attached to respective tongues 142, 148 and extend above the rider's leg, defining the top of the inverted "U" with the steering shafts 106L, 106R defining the sides.

The construction and arrangement of the steering assembly 40 introduces a track differential into the steering of the front wheels 38L, 38R. As is well known, when two laterally spaced wheels on a vehicle are simultaneously turned, the angle of turn of the outside wheel does not have to be as great as the inside wheel. In the illustrated embodiment, the tricycle 10 has a front wheel tread width of 30 inches and a wheel base of 39 inches. When the wheels 38L, 38R are turned as far as possible in one direction, the inside wheel on the turn is rotated by the steering assembly 45° from its straight ahead position, and the outside wheel on the turn is rotated 30° from its straight ahead position. Thus, the tricycle 10 of the present invention has smooth and efficient steering. No power is wasted in a turn sliding an over-steered outside wheel across the roadway.

The tricycle 10 illustrated herein has an overall length of 68 inches, or about the length of a conventional bicycle. The front wheels 38L, 38R are 14 inches in diameter and the rear wheel is 20 inches in diameter. The seat 16 is located about 22 inches from the ground and has a high back. Thus, the rider and tricycle have a low center of gravity and the high back provides a reaction surface for applying force to the pedals 44L, 44R to drive the tricycle. The dimensions of the tricycle 10 are believed to be particularly practical and advantageous, but the dimensions may be other than specified and still fall within the scope of the present invention.

In view of the above, it will be seen that the several objects of the invention are achieved and other advantageous results attained.

As various changes could be made ill the above constructions without departing from the scope of the invention, it is intended that all matter contained in the above description or shown in the accompanying drawings shall be interpreted as illustrative and not in a limiting sense.

What is claimed is:

1. A drive assembly for a rider propelled vehicle comprising:
   a shaft mounted on the vehicle for rotation about a drive axis;
   a pair of crank arms operatively connected to the shaft for rotating the shaft about the drive axis with the crank arms revolving around the drive axis;
   a pair of pedals each capable of being driven by a pumping motion of one of the rider's legs along a repeating path through a first dead center position in which the rider's leg is generally in its most fully flexed position, and a second dead center position in which the rider's leg is generally in its most fully extended position;
   means operatively connecting each of the pedals to a respective crank arm, said connecting means being operable to transmit the motion of the pedals to the crank arms and being movable relative to the crank arms so that when the pedals are in their respective first and second dead center positions the force applied by the rider's leg to the pedal in the first dead center position is directed by said connecting means along a line spaced from the axis of rotation of the shaft; and
   a power assist device operatively connected to the vehicle and the shaft, the power assist device being operable to store energy during a first portion of a revolution of the crank arms, release energy during a second portion of the revolution of the crank arms to assist in driving the rotation of the shaft, store energy during a third portion of the revolution of the crank arms, and release energy during a fourth portion of the revolution of the crank arms to assist in driving the rotation of the shaft.

2. A drive assembly as set forth in claim 1 wherein said connecting means comprises a power arm mounted for rotation on the drive axis for relative rotational movement between the power arm and crank arm, and link means interconnecting the power arm and crank arm for transmitting motion from the power arm to the crank arm for rotating the crank arm and shaft, said link means accelerating the power arm ahead of the crank arm during one portion of the crank arm revolution and decelerating the power arm behind the crank arm during another portion of the crank arm revolution.

3. A drive assembly as set forth in claim 2 wherein said link means comprises a cam surface in one of the crank arm and power arm, and a first cam follower carried by the other of the crank arm and power arm and engaging the cam surface.

4. A drive assembly as set forth in claim 3 wherein the power assist device comprises energy storing means, the power assist device transferring energy to said energy storing means during said first and third portions of the revolution of the crank arms, and transferring energy from said energy storing means to the cam during said second and fourth portions of tire revolution of the crank arms.

5. A drive assembly as set forth in claim 4 wherein the power assist device transfers energy to the shaft for rotation thereof when the pedals pass through the first and second dead center positions.

6. A drive assembly as set forth in claim 5 wherein the power assist device further comprises a cam fixedly attached to the shaft for conjoint rotation therewith, and a second cam follower attached to the said energy storing means, the cam slidably engaging the cam follower.

7. A drive assembly as set forth in claim 6 wherein the second cam is generally circular and the cam follower has a generally circular opening therein adapted to slidingly hold the cam.

8. A drive assembly as set forth in claim 7 wherein the center of the cam is angularly offset from the crank arms relative the axis of rotation of the shaft.

9. A drive assembly as set forth in claim 1 further comprising means mounting said pair of pedals on the vehicle for reciprocating motion.

10. A drive assembly as set forth in claim 9 wherein mounting means comprises a track having channels and slides receivable in the channels for reciprocating motion therein, each pedal being mounted on a respective slide, the slides and track being made of a low-friction material permitting the slides to engage the track in the channels and to freely slide in the channels.

11. A rider propelled vehicle comprising:
   a chassis having a front, a rear and left and right sides;
   a seat for the rider mounted on the chassis;
   left and right steering shafts mounted forwardly of the seat generally at respective laterally opposite sides of the chassis for pivoting about the longitudinal axes of the shafts;
   left and right wheels mounted on the left and right steering shafts, respectively, for turning about the longitudinal axes of the shafts;
   a steering assembly for turning the steering shafts about their respective longitudinal axes, the steering assembly including a steering actuator positioned for the rider to grasp and turn relative to the chassis while sitting in the seat to steer the vehicle;
   the steering assembly and the steering shafts being arranged in a generally inverted-U shape so that the rider's legs may extend through the inverted U to propel said vehicle;
   a drive assembly for powering the vehicle comprising:
   a shaft mounted on the vehicle for rotation about a drive axis;

a pair of crank arms operatively connected to the shaft for rotating the shaft about the drive axis with the crank arms revolving around the drive axis;

a pair of pedals each capable of being driven by a pumping motion of one of the rider's legs along a repeating path through a first dead center position in which the rider's leg is generally in its most fully flexed position, and a second dead center position in which the rider's leg is generally in its most fully extended position;

means operatively connecting each of the pedals to a respective crank arm, said connecting means being operable to transmit the motion of the pedals to the crank arms and being movable relative to the crank arms so that when the pedals are in their respective first and second dead center positions the force applied by the rider's leg to the pedal in the first dead center position is directed by said connecting means along a line spaced from the axis of rotation of the shaft; and a power assist device operatively connected to the vehicle and the shaft, the power assist device being operable to store energy during a first portion of a revolution of the crank arms, release energy during a second portion of the revolution of the crank arms to assist in driving the rotation of the shaft, store energy during a third portion of the revolution of the crank arms, and release energy during a fourth portion of the revolution of the crank arms to assist in driving the rotation of the shaft.

12. A vehicle as set forth in claim 11 wherein the longitudinal axes of the steering shafts are oriented substantially vertically.

13. A vehicle as set forth in claim 12 wherein said pair of pedals are mounted on the chassis for substantially linear reciprocating motion.

14. A vehicle as set forth in claim 13 wherein the steering assembly further comprises a steering column mounted for rotation with the steering actuator on the chassis and linkage means connecting the column to the left and right wheels, said linkage means comprising a first connector connected at one end generally to the right side of the steering column and at the opposite end to the left steering shaft, and a second connector connected at one end generally to the left side of the steering column and at the opposite end to the right steering shaft such that when the left and right wheels are turned the inside wheel in the turn is pivoted further than the outside wheel in the turn.

15. A vehicle as set forth in claim 11 wherein the chassis includes a front section formed as one piece and having the steering shafts, steering assembly and said pedal means mounted thereon.

16. A vehicle as set forth in claim 15 wherein the front section is molded and has a generally inverted U-shaped cross section.

17. A vehicle as set forth in claim 16 wherein the front section is closed at a forward end thereof thereby presenting a curved surface to guide air around the front section with minimal resistance.

18. A vehicle as set forth in claim 15 wherein the front section includes left and right mounting portions for mounting the left and right steering shafts, respectively, the left and right mounting portions projecting laterally outwardly of the front section and being generally polygonal in cross section and having reinforcing ribbing therein to strengthen the mounting portion.

19. A vehicle as set forth in claim 15 further comprising a step portion at a rearward end of the front section for the rider to step on when entering the vehicle.

20. A vehicle as set forth in claim 19 wherein the chassis further includes a rear section connected to the front section generally at the step portion thereof, the rear section mounting a powered wheel thereon adapted to be driven by the drive assembly.

* * * * *